No. 739,621. Patented September 22, 1903.

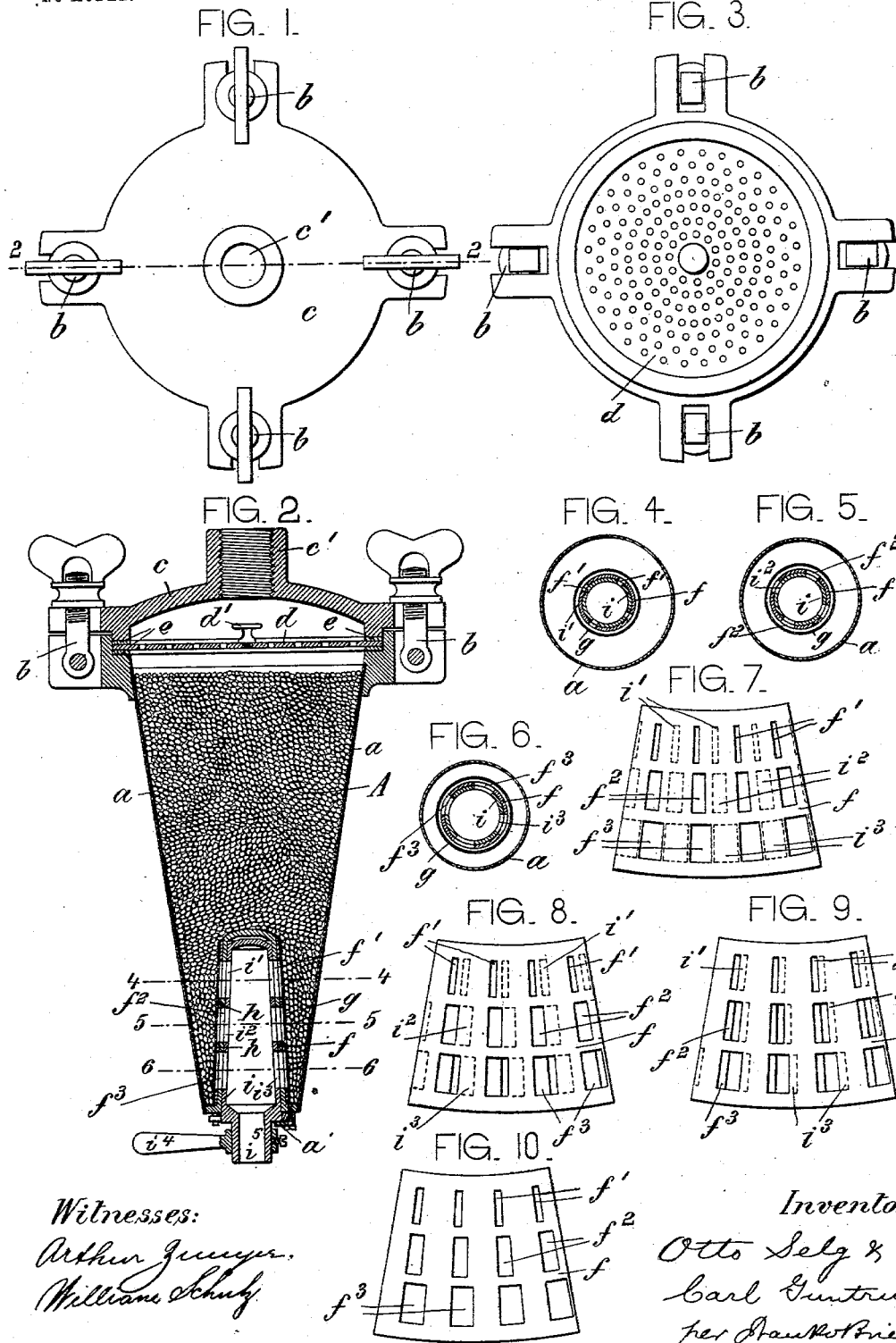

UNITED STATES PATENT OFFICE.

OTTO SELG AND CARL GUNTRUM, OF NEW YORK, N. Y., ASSIGNORS OF ONE-THIRD TO CHRISTIAN JAEGER AND JOSEF SCHOETTL, OF BROOKLYN, NEW YORK.

LIQUID-FILTER.

SPECIFICATION forming part of Letters Patent No. 739,621, dated September 22, 1903.

Application filed April 24, 1903. Serial No. 154,095. (No model.)

*To all whom it may concern:*

Be it known that we, OTTO SELG and CARL GUNTRUM, citizens of the United States and both residing at New York city, Brooklyn, county of Kings, and State of New York, have invented certain new and useful Improvements in Liquid-Filters, of which the following is a specification.

This invention relates to a filter for water and other liquids which produces a filtrate of great purity and may be readily set to different kinds of liquids.

In the accompanying drawings, Figure 1 is a plan of our improved liquid-filter; Fig. 2, a longitudinal section thereof on line 2 2, Fig. 1; Fig. 3, a plan of the filter with the lid removed; Fig. 4, a cross-section on line 4 4, Fig. 2; Fig. 5, a cross-section on line 5 5, Fig. 2; Fig. 6, a cross-section on line 6 6, Fig. 2. Figs. 7 to 10 are diagrams of the valve-casing rolled out into a plane and showing consecutive positions of the cock.

The letter $a$ represents a shell containing the pulp or other filtering material A and made of a frusto-conical shape, so as to diminish in diameter from top to bottom. To the top of shell $a$ is secured by swinging bolts $b$ a removable cover $c$, having water-inlet or pipe-coupling $c'$. Between the shell and cover is interposed a perforated plate or spreader $d$, having knob $d'$ and packed at both sides by gaskets $e$. Into the lower end of shell $a$ projects a conical valve-casing $f$, which tapers in a reverse direction from shell $a$, increasing in diameter from top to bottom. To the outer side of casing $f$ is secured, in parallelism therewith, a screen $g$, which thus likewise tapers from top to bottom. Between casing and screen are interposed a number of parallel circumferential rings or flanges $h$, which set the screen slightly off the casing and divide the latter into a number of horizontal zones. This setting off of the screen renders the entire surface of the latter available for filtering purposes, while the rings, moreover, separate the liquid flowing to the several zones. Each of the zones is provided with uniform slots or outlets, the slots of the various zones increasing in size from zone to zone. Thus the slots $f'$ of the upper zone are narrow, the slots $f^2$ of the central zone are somewhat wider, and the slots $f^3$ of the bottom zone are still wider. The relative arrangement of the slots is such that the central slots $f^2$ project laterally beyond the upper slots $f'$, while the lower slots $f^3$ project laterally beyond the central slots, Fig. 10.

Within the casing $f$ turns a hollow cock or plug $i$, provided with slots $i'$ $i^2$ $i^3$, which are adapted to register with the corresponding slots $f'$ $f^2$ $f^3$ of the casing. The cock may be rotated upon its support $a'$ by a handle $i^4$ and has the axial water-outlet $i^5$. By the peculiar arrangement of openings described the purity of the filtrate and the rapidity of flow may be easily regulated. Thus by a slight turn of cock $i$ the slots $f^3$ of the bottom zone will be partly opened, while the slots $f^2$ $f'$ will remain closed, Fig. 8. In this position the liquid must traverse the entire body of the pulp and its overflow is checked, so that a very pure filtrate is obtained. By a slight turn of the cock the lower slots $f^3$ are further opened, the slots $f^2$ of the central zone are partly opened, while the upper slots $f'$ remain closed, Fig. 9. In this position part of the liquid passes through less strata of pulp A and its egress is facilitated, so that a less pure but more rapidly-flowing filtrate is discharged. By a further turn of the cock the slots $f^3$ $f^2$ $f'$ of all the zones are opened, Fig. 10, to obtain a rapidly-flowing filtrate of still less purity. By turning the cock back all the slots will be closed, Fig. 7, to stop the outflow. In this way the filter may be readily set to the quality of the liquid operated upon and to the quality of the filtrate desired.

The coniform construction of shell $a$, together with the reverse coniform construction of the upwardly-extending casing $f$, forms a tapering pocket at the lower end of the shell. This tapering pocket packs the filtering material tightly around the outflow-openings and directs the liquid to such openings, so that the efficiency of the filter is considerably enhanced.

What we claim is—

1. A liquid-filter having a tapering shell, a reversely-tapering casing projecting into the bottom of the shell, a discharge-cock within the casing, and filtering material within the shell, substantially as specified.

2. A liquid-filter having a tapering shell, a reversely-tapering perforated casing, an inclosed cock, a screen surrounding the casing, and rings between casing and screen, substantially as specified.

3. A liquid-filter having a tapering shell, a reversely-tapering casing having openings of gradually-increasing size, an inclosed cock having corresponding openings, a screen surrounding the casing, and rings between casing and screen, substantially as specified.

Signed by us at New York city, (Manhattan,) New York, this 23d day of April, 1903.

OTTO SELG.
CARL GUNTRUM.

Witnesses:
   JOSEPH SCHVETTL,
   CHRISTIAN JAEGER.